(12) United States Patent
Christison

(10) Patent No.: US 8,432,484 B2
(45) Date of Patent: Apr. 30, 2013

(54) CAMERA MODULES

(75) Inventor: Eric Christison, Lothian (GB)

(73) Assignee: STMicroelectronics (R&D) Ltd., Marlow Bucks (GB)

( * ) Notice: Subject to any disclaimer, the term of this patent is extended or adjusted under 35 U.S.C. 154(b) by 1141 days.

(21) Appl. No.: 11/931,747

(22) Filed: Oct. 31, 2007

(65) Prior Publication Data
US 2009/0109326 A1 Apr. 30, 2009

(51) Int. Cl.
*H04N 5/225* (2006.01)
(52) U.S. Cl.
USPC .......................... 348/373; 348/374; 348/375
(58) Field of Classification Search ........... 348/373–376
See application file for complete search history.

(56) References Cited

U.S. PATENT DOCUMENTS
2006/0007351 A1* 1/2006 Choi et al. ................. 348/374
2007/0183773 A1* 8/2007 Aoki et al. ................. 396/529

OTHER PUBLICATIONS

Cost Savings at Expense of Quality, Safety and the Environment, Richard H. Barden, Oct. 21, 2006.*
ASTM International, Designation D3359-02, "Standard Test Methods for Measuring Adheison by Tape Test ₁", pp. 1-7.

* cited by examiner

*Primary Examiner* — Lin Ye
*Assistant Examiner* — Euel Cowan
(74) *Attorney, Agent, or Firm* — Allen, Dyer, Doppelt, Milbrath & Gilchrist, P.A.

(57) ABSTRACT

A camera module may include a mount and a barrel coupled to the mount. One of the barrel and the mount may include a polycarbonate material and the other of the barrel and the mount may include a liquid crystal polymer (LCP) material.

19 Claims, 3 Drawing Sheets

Zenite 6330 BK10

Zenite 5130L

Zenite 6330 BK10

Zenite 5130L

Zenite 16130A BK10

Zenite 6635

Vectra S135 D-2

XYDAR G-930

CAMERA MODULES

FIELD OF THE INVENTION

The present invention relates to the technical, field of camera modules and, in particular, to camera modules such as for digital cameras.

BACKGROUND OF THE INVENTION

A "camera module" is an assembly for housing optical elements and image sensing apparatus for use with a digital image sensor and devices incorporating such sensors. An example of a typical camera module is shown in FIG. 1, in an exploded view. The camera module comprises a barrel 10 and a mount 12. The barrel 10 is for carrying optical elements, for example, articles for refracting and/or reflecting light, such as lenses. The optical elements are emitted from FIG. 1 for the purposes of clarity of illustration. The mount 12 is for receiving an image sensing element (or elements) 14 for the conversion of incident radiation to an image. For a digital camera, the image sensing element 14 can be a digital image sensor such as a CMOS or COD integrated circuit.

The camera module comprises, as its basic components, the barrel 10 and the mount 12. In an assembly line, optical elements are affixed to the barrel and image sensing elements 14 are affixed to the mount 12, the barrel 10 is fitted onto the mount 12, and the resultant manufactured product is referred to as a "camera module". For the purposes of the present application, the term "camera module" may be taken as being applicable equally to the barrel 10 and mount 12 components alone (either separately or assembled together), or to the complete assembled product comprising the barrel 10, optical elements, mount 12 and image sensing apparatus 14, together with other ancillary components which may be incorporated for different specific applications.

The camera module can then be incorporated into a printed circuit board (PCB) forming part of a digital camera. The image sensing apparatus 14 can be provided with input and output electrical contacts which receive command signals and output image data respectively. Depending on the application, different image processing functions can be carried out within the image sensing apparatus 14, or can be carried out by other circuitry in the PCB.

It is common for the barrel 10 and the mount 12 to be engageable with a screw thread, which in the example of FIG. 1, would be provided on the outer surface of the barrel 10 and an inner surface of the mount 12. The barrel 10 can be rotated with respect to the mount 12 during manufacture to adjust the position of the optical elements carried by the barrel 10, thereby setting the focus of the image sensor. For adjustable focus devices, further rotation may be carried out at the behest of a user on a manual or automatic basis.

The rotation, either during or after manufacture, may generate frictional forces because of the motion of the barrel with respect to the mount, which may cause some degradation of the barrel 10 and/or the mount 12 resulting in the generation of debris, known in the art as foreign matter (FM). The debris falls onto the image sensing apparatus and results in a loss of image quality, as the FM blocks incident radiation, and thus results in the loss of image data. This loss of image data can cause a significant number of assembled camera modules to fail quality checks performed at the end of the manufacturing process, or, for adjustable focus devices, causes image degradation after manufacture.

SUMMARY OF THE INVENTION

According to a first aspect, there is provided a camera module comprising a barrel and a mount, wherein one of the barrel or the mount may be formed from a polycarbonate material and the other of the barrel or the mount may be formed from a liquid crystal polymer (LCP) material.

The LCP material may be a self-lubricating LCP material, or can be any one of Zenite® 6330 BK 10; Zenite® 5130L; Zenite® 16130A BK10; Zenite® 6635; Vectra® S 135 D-2; XYDAR® G390; Dupont LCP 5115; Dupont 17235; Sumitomo 5130; or Tricona E130i. Zenite® 5130L is used in one embodiment.

According to a second aspect, there is provided a cellular telephone comprising a camera module including a barrel and a mount, wherein one of the barrel or the mount is formed from a polycarbonate material and the other of the barrel or the mount is formed from a liquid crystal polymer (LCP) material.

According to a third aspect, there is provided an optical pointing device including camera module comprising a barrel and a mount, wherein one of the barrel or the mount is formed from a polycarbonate material and the other of the barrel or the mount is formed from a liquid crystal polymer (LCP) material. The optical pointing device can be an optical mouse or a trackball.

According to further aspects, there is provided a device comprising a camera module comprising a barrel and a mount, wherein one of the barrel or the mount is formed from a polycarbonate material and the other of the barrel or the mount is formed from a liquid crystal polymer (LCP) material. The device can for example be a cellular telephone, optical pointing device such as a mouse or trackball, a webcam, barcode reader, digital still camera, dedicated video camera (camcorder) device, personal computer, laptop computer.

BRIEF DESCRIPTION OF THE DRAWINGS

The present invention will be described, by way of example only, with reference to the accompanying drawings.

DETAILED DESCRIPTION OF THE PREFERRED EMBODIMENTS

Figure 1:
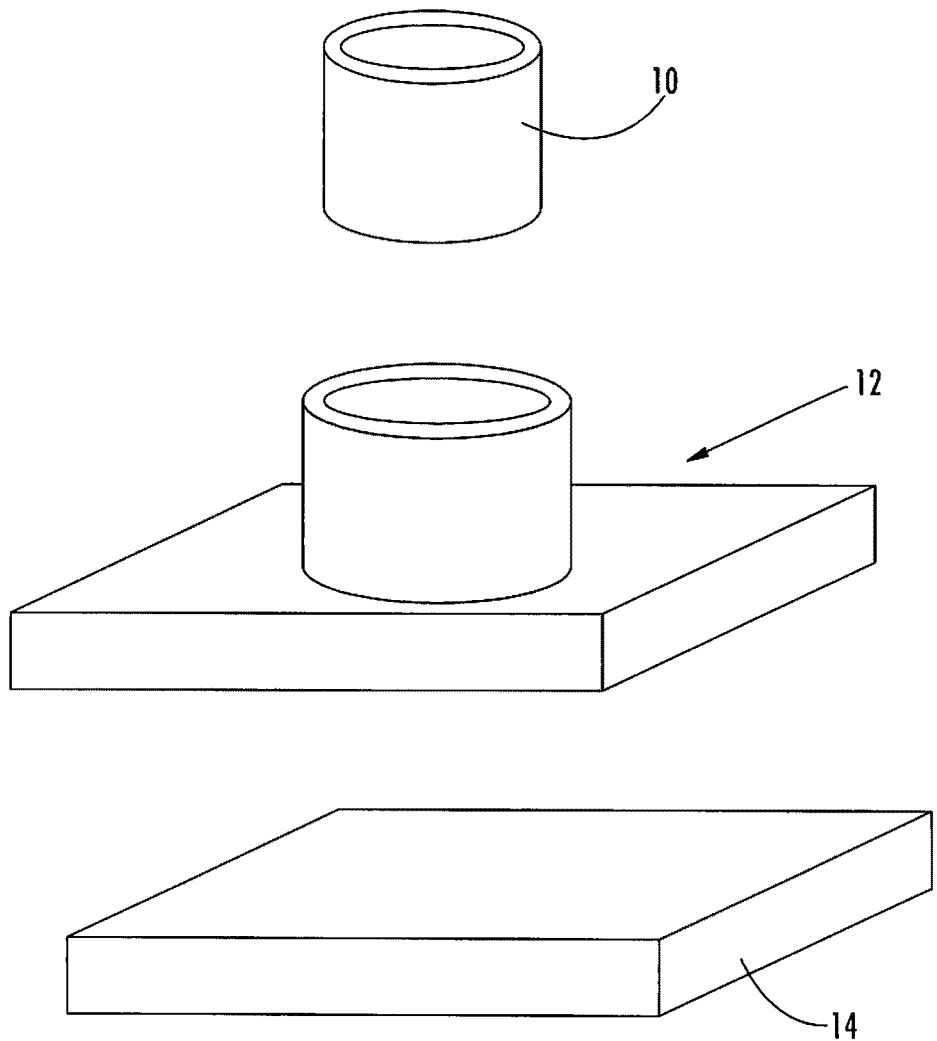
FIG. 1 shows a camera module in exploded form as in the prior art.

The loss of image data that is caused by FM can also be compensated for by image processing techniques, such as the use of defect correction algorithms to identify the defective image data and calculate replacement values, for example.

Mechanical techniques can also be applied. The pass rate of camera modules in the manufacturing process can be increased by the addition of a compressible washer under the lens barrel to prevent the FM falling into the optical path. However, this reduces the space available for the optical elements and increases the cost of the camera module.

Another approach is to add grease to the screw threads to trap debris as it is generated. However, this again adds to the cost of the camera and furthermore it reduces the resistance to the turning of the barrel in the lens mount and so necessitates a further fixing process after the lens has been initially focussed. An alternative approach pays attention to the materials used in the camera module.

Typically, both the barrel and mount components in a camera module are formed from a polycarbonate material. Polycarbonate materials are used because they are suitable for injection molding and extrusion manufacturing techniques, and they demonstrate high temperature resistance and high impact resistance.

Because of the existence of digital techniques and of mechanical techniques of adding a washer or grease to the camera module, combined with the fact that the material choice of polycarbonate is a commonly accepted standard, there is no motivation for a person skilled in the art of camera module design to consider the choice of material of the barrel or mount components as having any effect for reducing FM generation.

Furthermore, the amount of FM that would be generated by a material cannot be determined by reference to known characteristics of given materials, as taught for example in manufacturers' data sheets defining the physical, mechanical, thermal, electrical, optical and chemical properties of the materials they make.

The exact mechanisms that lead to FM generation have not been formally explored, however it seems the factors influencing FM generation could be related to the relative hardness of materials, the coefficient of friction, surface energy, toughness, or thread shape and dimensions. Having said this, it should be emphasised that there is no known way of translating these and other known characteristics of materials and/or design parameters into an estimate of FM generation for a specific camera module design.

However, the applicants have made assiduous studies into the design of camera modules, and have tested various different materials. Against conventional practice, they decided to test the effects of forming the mount and the barrel from different materials.

It has been found that FM generation is markedly reduced when either the barrel is formed from polycarbonate and the mount is formed from a liquid crystal polymer (LCP), or where the barrel is formed from a liquid crystal polymer (LCP) and the mount is formed from a polycarbonate.

A marked reduction of FM generation has been observed for all grades of LCP that were tested, but it has been observed that LCP grades which are self-lubricating (in which the base polymer is blended with a lubricant) demonstrate particular advantages.

FIG. 2 shows the results of a tape adhesion test for various grades of LCP, where an adhesive tape was stuck to the LCP, and then removed. The amount of material that is dislodged and is left affixed to the tape after its removal gives a subjective measure of the "flakiness" of each material, which is a measure of the bond strength of the LCP.

The test was carried out without any cross-cutting being made in the LCP surface. The type of tape, method of application and removal were in accordance with the procedures set out in the standard D 3359-02 published by ASTM International and entitled "*Standard Test Methods for Measuring Adhesion* by Tape Test", said publication being incorporated herein by reference to the maximum extent allowable by law.

Figure 2A:
FIGS. 2a-2f show the results of a tape adhesion tests for a selection of grades of liquid crystal polymer for a camera module in accordance with the invention.
Figure 2B:
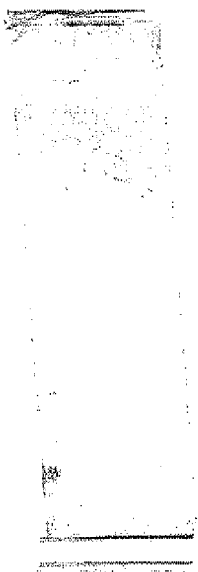
Figure 2C:
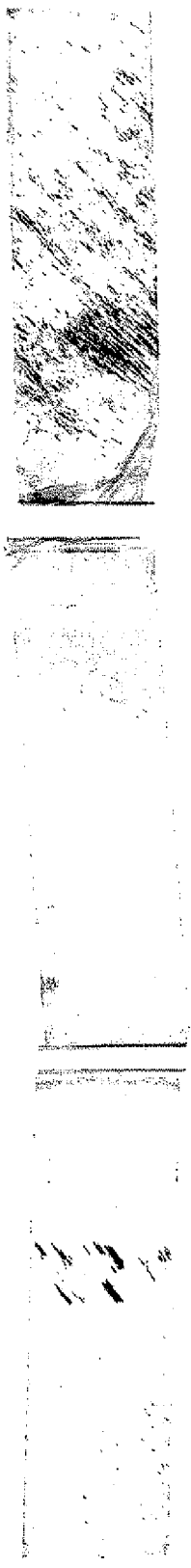
Figure 2D:
Figure 2E:
Figure 2F:

As seen in FIGS. 2a-2f, tape adhesion tests were carried out for six grades of LCP; Zenite® 6330 BK 10 (FIG. 2a); Zenite® 5130L (FIG. 2b); Zenite® 16130A BK10 (FIG. 2c); and Zenite® 6635 (FIG. 2d) manufactured by the Dupont corporation; Vectra® S 135 D-2 (FIG. 2e) manufactured by Tricona, and XYDAR® G390 (FIG. 2f) manufactured by Solvay Advanced Polymers.

From a subjective review of the tape tests, it can be seen that Zenite® 5130L demonstrates the highest adhesion, as it results in the cleanest tape after the test has been carried out.

Tests also revealed that, of these six materials, that Zenite® 5130L provides the greatest reduction in FM generation when used as the material for forming the mount or the barrel, with the other component (barrel or mount) being formed from polycarbonate. The grade of polycarbonate used can be for example Lupilon S3000R-9010, manufactured by Mitsubishi, although the results hold true for any grade of polycarbonate.

The exact relationship between adhesive properties and effectiveness for reducing FM generation is not known, but the above results suggest that in general, the combination of one polycarbonate component with a second component formed from a grade of LCP with relatively high adhesiveness may result in lower levels of FM generation as compared with the case where the second component is formed from a grade of LCP with relatively low adhesiveness.

Other grades of LCP that have been tested included Dupont LCP 5115, Dupont 17235, Sumitomo 5130 and Tricona E130i. Given the hundreds of grades of LCP that are available it has not been practical to test every grade, but these grades and the others that have been tested give a solid basis for concluding that the effect of a reduced FM generation can be seen for any grade of LCP.

It is to be noted also that LCP is conventionally not chosen for camera modules because it can be difficult to form and it can be difficult to obtain reliable adhesive joints. However, these disadvantages are outweighed by the advantages of the lower FM generation (and hence higher yield of devices that pass manufacturing quality tests) given by the material selection as set out in this disclosure.

Figure 3:
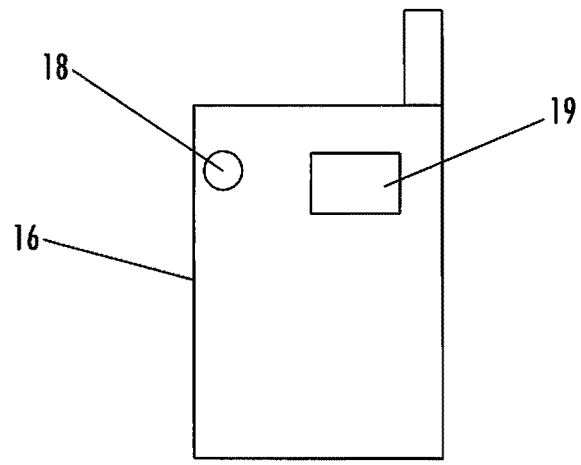
FIG. 3 shows a cellular telephone comprising the camera module in accordance with the present invention.

FIG. 3 shows a cellular telephone 16 comprising a camera module 18 as set out above. The figure shows a reverse side of the phone 16, and the camera module 18 is used for the capture of still images and video. The phone 16 is also provided with a flash 19 to aid image capture.

Figure 4:
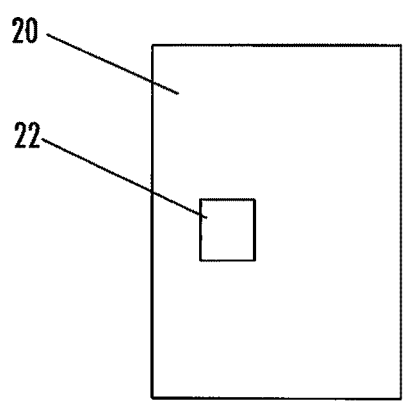
FIG. 4 shows a device comprising the camera module in accordance with the present invention.

FIG. 4 shows a generic device 20 incorporating a camera module 22 as disclosed above, which is incorporated in a generic fashion at a generic location. The device 20 could be a cellular telephone as shown in FIG. 3, or it could be any other type of device, such as an optical pointing device (for example an optical mouse or trackball), a webcam, barcode reader, digital still camera, dedicated video camera (camcorder) device, personal computer, laptop computer and so on.

It will be appreciated that for each of the devices mentioned above and illustrated in FIGS. 3 and 4, that the positioning and fitting of the camera module is of a standard nature that is well understood, and so does not require further explanation herein.

While this detailed description has set forth some embodiments of the present invention, the appended claims cover other embodiments which differ from the described embodiments according to various modifications and improvements. For example, the specific grade of LCP used for either one of the mount or the barrel can be different from those mentioned as specific examples above, and the specific grade of polycarbonate used for either one of the mount or the barrel can be chosen without limitation. Also, the list of devices above is not exhaustive.

Within the appended claims, unless the specific term "means for" or "step for" is used within a given claim, it is not intended that the claim be interpreted under 35 U.S.C. 112, paragraph 6.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A camera module comprising:
    a mount; and
    a barrel coupled to said mount and movable along an interface therewith;
    one of said barrel and said mount comprising a polycarbonate material and the other of said barrel and said mount comprising a liquid crystal polymer (LCP) material, said LCP material being self-lubricating so that the interface between said mount and said barrel is lubricated.

2. The camera module according to claim 1, wherein said LCP material comprises at least one of Zenite® 6330 BK 10, Zenite® 5130L, Zenite® 16130A BK10, Zenite® 6635, Vectra® S 135 D-2, XYDAR® G390, Dupont LOP 5115, Dupont 17235, Sumitomo 5130, and Tricona E130i.

3. The camera module according to claim 1, wherein said LOP material comprises Zenite® 5130L.

4. The camera module according to claim 1 further comprising at least one image sensing element coupled to said mount.

5. The camera module according to claim 1 further comprising at least one optical element carried by said barrel.

6. The camera module according to claim 5 wherein said at least one optical element comprises a lens.

7. An electronic device comprising:
    a housing; and
    a camera module carried by said housing; and comprising
        a mount, and
        a barrel coupled to said mount and movable along an interface therewith,
        one of said barrel and said mount comprising a polycarbonate material and the other of said barrel and said mount comprising a liquid crystal polymer (LOP) material, said LOP material being self-lubricating so that the interface between said mount and said barrel is lubricated.

8. The electronic device according to claim 7, wherein said LCP material comprises at least one of Zenite® 6330 BK 10, Zenite® 5130L, Zenite® 16130A BK10, Zenite® 6635, Vectra® S 135 D-2, XYDAR® G390, Dupont LOP 5115, Dupont 17235, Sumitomo 5130, and Tricona E130i.

9. The electronic device according to claim 7, wherein said LOP material is Zenite® 5130L.

10. The electronic device according to claim 7, wherein said camera module further comprises at least one image sensing element coupled to said mount.

11. The electronic device according to claim 7, wherein said camera module further comprises at least one optical element carried by said barrel.

12. The camera module according to claim 11 wherein said at least one optical element comprises a lens.

13. The electronic device according to claim 7, wherein the electronic device comprises at least one of a cellular phone, an optical mouse, a trackball, a webcam, a barcode reader, a digital still camera, a dedicated video camera, a personal computer, and a laptop computer.

14. A method of making a camera module comprising:
    coupling a barrel to a mount so that it is movable along an interface therewith; and
    wherein one of the barrel and the mount comprises a polycarbonate material and the other of the barrel and the mount comprises a liquid crystal polymer (LCP) material, the LCP material being self-lubricating so that the interface between the mount and the barrel is lubricated.

15. The method according to claim 14, further comprising coupling at least one optical element to the barrel.

16. The method according to claim 15, wherein the at least one optical element comprises a lens.

17. The method according to claim 14, further comprising coupling at least one image sensing element to the mount.

18. The method according to claim 14, wherein the LCP material comprises at least one of Zenite® 6330 BK 10, Zenite® 5130L, Zenite® 16130A BK10, Zenite® 6635, Vectra® S 135 D-2, XYDAR® 6390, Dupont LCP 5115, Dupont 17235, Sumitomo 5130, and Tricona E130i.

19. The method according to claim 14, wherein the LCP material comprises Zenite® 5130L.

\* \* \* \* \*

UNITED STATES PATENT AND TRADEMARK OFFICE
CERTIFICATE OF CORRECTION

PATENT NO. : 8,432,484 B2
APPLICATION NO. : 11/931747
DATED : April 30, 2013
INVENTOR(S) : Eric Christison Page 1 of 1

It is certified that error appears in the above-identified patent and that said Letters Patent is hereby corrected as shown below:

In the Claims:

Column 5, Line 19        Delete: "Dupont LOP 5115"
                         Insert: --Dupont LCP 5115--

Column 5, Line 38        Delete: "polymer (LOP)"
                         Insert: --polymer (LCP)--

Column 5, Line 39        Delete: "said LOP material"
                         Insert: --said LCP material--

Column 6, Line 4         Delete: "Dupont LOP 5115"
                         Insert: --Dupont LCP 5115--

Column 6, Line 7         Delete: "LOP material"
                         Insert: --LCP material--

Signed and Sealed this
Twenty-third Day of July, 2013

Teresa Stanek Rea
*Acting Director of the United States Patent and Trademark Office*